United States Patent
Kwon et al.

(10) Patent No.: US 12,321,261 B2
(45) Date of Patent: Jun. 3, 2025

(54) STORAGE DEVICE TRANSLATING LOGICAL ADDRESS ON THE BASIS OF SEQUENTIALITY OF NAMESPACE, AND METHOD THEREOF

(71) Applicant: SK hynix Inc., Icheon-si (KR)

(72) Inventors: Ku Ik Kwon, Icheon-si (KR); Jun Han Lee, Icheon-si (KR); Byoung Min Jin, Icheon-si (KR); Gyu Yeul Hong, Icheon-si (KR)

(73) Assignee: SK hynix inc., Icheon-si (KR)

( * ) Notice: Subject to any disclaimer, the term of this patent is extended or adjusted under 35 U.S.C. 154(b) by 9 days.

(21) Appl. No.: 18/178,887

(22) Filed: Mar. 6, 2023

(65) Prior Publication Data

US 2024/0152451 A1    May 9, 2024

(30) Foreign Application Priority Data

Nov. 7, 2022 (KR) .................. 10-2022-0146930

(51) Int. Cl.
*G06F 12/02* (2006.01)

(52) U.S. Cl.
CPC ...... *G06F 12/0246* (2013.01); *G06F 12/0292* (2013.01); *G06F 2212/7201* (2013.01)

(58) Field of Classification Search
CPC ...... G05B 13/00–048; G05B 15/00–02; G05B 17/00–02; G06F 1/00–3296; G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 18/00–41; G06F 17/00–40; G06F 21/00–88; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17;

(Continued)

(56) References Cited

U.S. PATENT DOCUMENTS 3,938,096 A * 2/1976 Brown ................ G06F 12/0292
                                                     711/201
4,763,244 A * 8/1988 Moyer ................ G06F 12/1027
                                                     711/E12.068

(Continued)

FOREIGN PATENT DOCUMENTS

KR    10-2020-0032404 A    3/2020

OTHER PUBLICATIONS

NAND Flash 101; ATP Electronics; 2020; retrieved from https://www.simms.co.uk/Uploads/Resources/50/f4366381-b992-425a-bec4-cca409b51a6c.pdf on May 10, 2024 (Year: 2020).*

(Continued)

*Primary Examiner* — Daniel C. Chappell

(57) ABSTRACT

A storage device may generate mapping information between a plurality of memory regions and one or more namespaces. The storage device may record information on empty memory regions among the plurality of memory regions in an empty table, and may determine empty memory regions to be mapped to a target namespace among the empty memory regions recorded in the empty table.

15 Claims, 14 Drawing Sheets

(58) Field of Classification Search
CPC ........... G06F 2221/00–2153; G06N 3/00–126; G06N 5/00–048; G06N 7/00–08; G06N 10/00; G06N 20/00–20; G06N 99/00–007; G06T 1/00–60; G06V 30/00–43; G11B 20/00–24; G11B 33/00–1493; G11C 11/00–5692; G11C 13/00–06; G11C 14/00–009; G11C 15/00–06; G11C 16/00–3495; G11C 17/00–18; G11C 2207/00–229; G11C 2216/00–30; H01L 25/00–50; H01L 2225/00–1094; H03M 7/00–707; H04L 9/00–38; H04L 12/00–66; H04L 41/00–5096; H04L 49/00–9094; H04L 61/00–59; H04L 67/00–75

See application file for complete search history.

(56) References Cited

U.S. PATENT DOCUMENTS

| | | | | |
|---|---|---|---|---|
| 4,882,683 | A * | 11/1989 | Rupp | G09G 5/393 345/568 |
| 5,446,854 | A * | 8/1995 | Khalidi | G06F 12/1018 711/100 |
| 5,684,974 | A * | 11/1997 | Onodera | G06F 12/121 718/1 |
| 5,729,710 | A * | 3/1998 | Magee | G06F 9/544 711/170 |
| 5,987,582 | A * | 11/1999 | Devic | G06F 12/1081 345/568 |
| 6,374,266 | B1 * | 4/2002 | Shnelvar | G06F 11/1453 |
| 6,385,690 | B1 * | 5/2002 | Iida | G11C 7/16 |
| 8,495,111 | B1 * | 7/2013 | Wang | G06F 3/0644 707/823 |
| 8,560,798 | B2 * | 10/2013 | Leggette | G06F 11/1076 711/170 |
| 10,223,254 | B1 * | 3/2019 | Frolikov | G06F 12/0246 |
| 10,275,361 | B2 * | 4/2019 | Ish | G06F 12/0246 |
| 10,324,834 | B2 * | 6/2019 | Seo | G06F 12/0246 |
| 10,402,092 | B2 * | 9/2019 | Dewitt | G06F 3/0631 |
| 11,797,433 | B2 * | 10/2023 | Bahirat | G06F 3/061 |
| 12,197,346 | B2 * | 1/2025 | Tadokoro | G06F 3/0679 |
| 2007/0033364 | A1 * | 2/2007 | Maeda | G06F 3/0613 711/170 |
| 2007/0143378 | A1 * | 6/2007 | Gorobets | G06F 12/0246 |
| 2012/0131264 | A1 * | 5/2012 | Oikawa | G06F 12/0246 711/E12.008 |
| 2014/0101369 | A1 * | 4/2014 | Tomlin | G06F 12/0246 711/E12.008 |
| 2014/0101538 | A1 * | 4/2014 | Style | G06F 40/143 715/234 |
| 2014/0181454 | A1 * | 6/2014 | Manula | G06F 12/1027 711/170 |
| 2014/0258588 | A1 * | 9/2014 | Tomlin | G06F 3/0607 711/103 |
| 2017/0255565 | A1 * | 9/2017 | Mosiolek | G06F 12/0238 |
| 2017/0351431 | A1 * | 12/2017 | Dewitt | G06F 3/0619 |
| 2018/0232314 | A1 * | 8/2018 | Lin | G06F 3/06 |
| 2018/0239697 | A1 * | 8/2018 | Huang | G06F 12/0246 |
| 2019/0018602 | A1 * | 1/2019 | Koo | G06F 3/0679 |
| 2019/0121547 | A1 * | 4/2019 | Frolikov | G06F 3/0652 |
| 2020/0133849 | A1 * | 4/2020 | Harris | G06F 12/0246 |
| 2020/0334165 | A1 * | 10/2020 | Manole | G06F 3/0665 |
| 2022/0083273 | A1 * | 3/2022 | Saito | G06F 3/0688 |

OTHER PUBLICATIONS

How does compression work really?; homosapien_1503; 2020; retrieved from https://www.reddit.com/r/compsci/comments/jh2wf1/how_does_compression_work_really/ on May 10, 2024 (Year: 2020).*

O. Kayiran et al., "Managing GPU Concurrency in Heterogeneous Architectures," 2014 47th Annual IEEE/ACM International Symposium on Microarchitecture, Cambridge, UK, 2014, pp. 114-126, doi: 10.1109/MICRO.2014.62. (Year: 2014).*

J. Shen et al., "Overlapping Aware Zone Allocation for LSM Tree-Based Store on ZNS SSDs," 2024 29th Asia and South Pacific Design Automation Conference (ASP-DAC), Incheon, Korea, Republic of, 2024, pp. 448-453, doi: 10.1109/ASP-DAC58780.2024.10473944. (Year: 2024).*

* cited by examiner

FIG.11
*sequential*
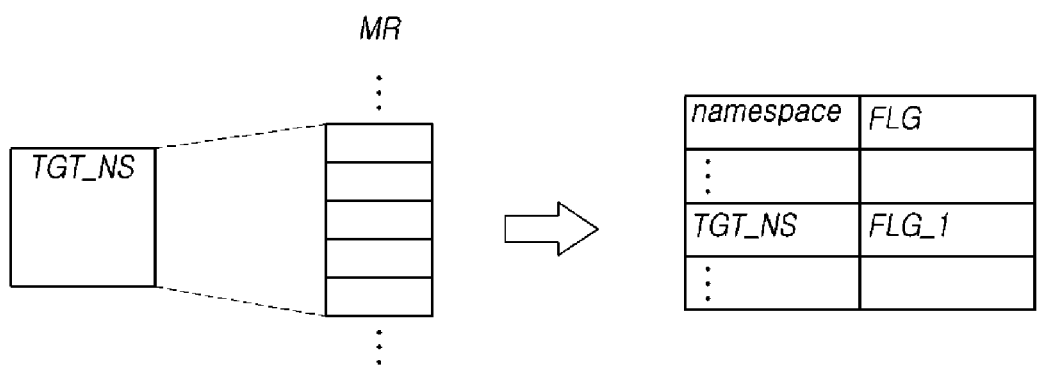
*non-sequential*
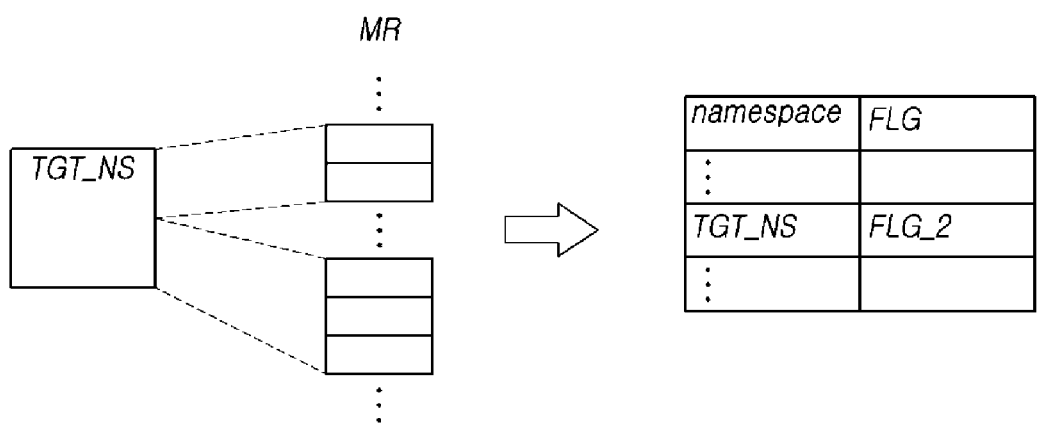

STORAGE DEVICE TRANSLATING LOGICAL ADDRESS ON THE BASIS OF SEQUENTIALITY OF NAMESPACE, AND METHOD THEREOF

CROSS-REFERENCE TO RELATED APPLICATION

The present application claims priority under 35 U.S.C. § 119(a) to Korean Patent Application No. 10-2022-0146930 filed in the Korean Intellectual Property Office on Nov. 7, 2022, which is incorporated herein by reference in its entirety.

BACKGROUND

1. Technical Field

Various embodiments generally relate to a storage device that translates a logical address on the basis of sequentiality of a namespace, and an operating method thereof.

2. Related Art

A storage device is a device that stores data on the basis of a request of an external device such as a computer, a mobile terminal such as a smartphone or a tablet, and various electronic devices.

The storage device may include a controller for controlling a memory (e.g., a volatile memory or a nonvolatile memory). The controller may receive a command from the external device, and may execute or control an operation for reading, writing, or erasing data with respect to the memory included in the storage device, based on the received command.

In order to efficiently use the storage device, the external device may divide the storage device into a plurality of namespaces. The plurality of namespaces as logical partitions may be created and deleted by the external device. The external device may manage data stored in the storage device, on the basis of the plurality of namespaces.

SUMMARY

Various embodiments are directed to a storage device capable of minimizing an overhead occurring in the process of translating a logical address of a namespace into a physical address of a memory, and an operating method thereof.

In an embodiment, a storage device may include: i) a memory including a plurality of memory regions; and ii) a controller configured to generate mapping information between the plurality of memory regions and one or more namespaces, to record information on empty memory regions, among the plurality of memory regions, that are not mapped to any namespace, in an empty table, and to determine, when a target namespace having a target size is created, empty memory regions to be mapped to the target namespace from among the empty memory regions recorded in the empty table.

In an embodiment, a method for operating a storage device may include: i) receiving, from an external device, a command indicating that a target namespace having a target size has been created; ii) searching for empty memory regions to be mapped to the target namespace, in an empty table in which information on empty memory regions not mapped to any namespace among a plurality of memory regions is recorded; and iii) mapping the searched empty memory regions to the target namespace.

In an embodiment, a controller may include: i) a memory interface capable of communicating with a memory including a plurality of memory regions; and ii) a control circuit configured to determine, on the basis of information on empty memory regions not mapped to any namespace among the plurality of memory regions, empty memory regions to be mapped to a target namespace having a target size among the empty memory regions.

According to the embodiments of the disclosed technology, it is possible to minimize an overhead occurring in the process of translating a logical address of a namespace into a physical address of a memory.

BRIEF DESCRIPTION OF THE DRAWINGS

FIG. 11 is a diagram illustrating flags for target namespaces according to an embodiment of the disclosure.

DETAILED DESCRIPTION

Figure 1:
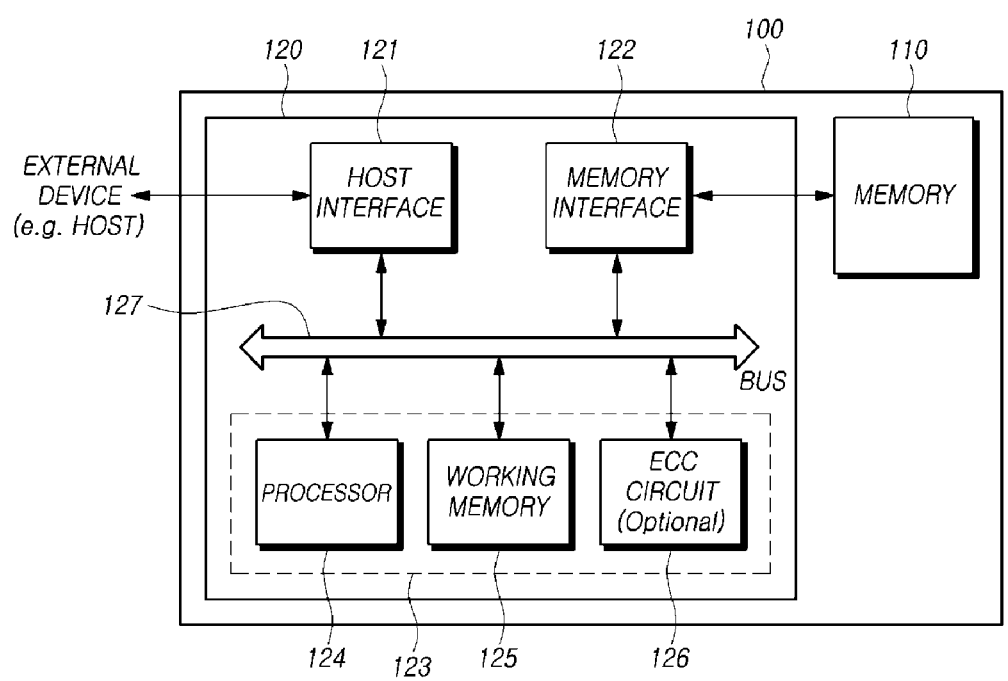
FIG. 1 is a schematic configuration diagram of a storage device according to an embodiment of the disclosure.

Hereinafter, embodiments of the present disclosure are described in detail with reference to the accompanying drawings. Throughout the specification, reference to "an embodiment," "another embodiment" or the like is not necessarily to only one embodiment, and different references to any such phrase are not necessarily limited to the same embodiment(s). The term "embodiments", when used herein, does not necessarily refer to all embodiments.

Various embodiments of the present invention are described below in more detail with reference to the accompanying drawings. However, the present invention may be embodied in different forms and variations, and should not be construed as being limited to the embodiments set forth herein. Rather, the described embodiments are provided so that this disclosure will be thorough and complete, and will fully convey the present invention to those skilled in the art to which this invention pertains. Throughout the disclosure, like reference numerals refer to like parts throughout the various figures and embodiments of the present invention.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing methods herein.

When implemented at least partially in software, the controllers, processors, devices, modules, units, multiplexers, generators, logic, interfaces, decoders, drivers, generators, and other signal generating and signal processing features may include, for example, a memory or other storage device for storing code or instructions to be executed, for example, by a computer, processor, microprocessor, controller, or other signal processing device.

FIG. 1 is a schematic configuration diagram of a storage device according to an embodiment of the disclosure.

Referring to FIG. 1, a storage device 100 may include a memory 110 that stores data, and a controller 120 that controls the memory 110.

The memory 110 includes a plurality of memory blocks, and operates in response to the control of the controller 120. Operations of the memory 110 may include, for example, a read operation, a program operation (also referred to as a write operation), and an erase operation.

The memory 110 may include a memory cell array including a plurality of memory cells (also simply referred to as "cells"), which store data. Such a memory cell array may exist in a memory block.

For example, the memory 110 may be implemented into various types such as a NAND flash memory, a 3D NAND flash memory, a NOR flash memory, a resistive random access memory (RRAM), a phase-change random access memory (PRAM), a magnetoresistive random access memory (MRAM), a ferroelectric random access memory (FRAM) and a spin transfer torque random access memory (STT-RAM).

The memory 110 may be implemented as a three-dimensional array structure. For example, embodiments of the disclosure may be applied to a charge trap flash (CTF) in which a charge storage layer is configured by a dielectric layer and a flash memory in which a charge storage layer is configured by a conductive floating gate.

The memory 110 may receive a command and an address from the controller 120 and may access an area that is selected by the address in the memory cell array. In other words, the memory 110 may perform an operation indicated by the command, on the area selected by the address.

The memory 110 may perform a program operation, a read operation or an erase operation. For example, when performing the program operation, the memory 110 may program data to the area selected by the address. When performing the read operation, the memory 110 may read data from the area selected by the address. In the erase operation, the memory 110 may erase data stored in the area selected by the address.

The controller 120 may control write (program), read, erase, and background operations for the memory 110. For example, background operations may include at least one from among a garbage collection (GC) operation, a wear leveling (WL) operation, a read reclaim (RR) operation, a bad block management (BBM) operation, and so forth.

The controller 120 may control the operation of the memory 110 according to a request from a device (e.g., a host) located outside the storage device 100. The controller 120, however, may control the operation of the memory 110 regardless of or in the absence of a request from the host.

The host may be a computer, an ultra mobile PC (UMPC), a workstation, a personal digital assistant (PDA), a tablet, a mobile phone, a smartphone, an e-book, a portable multimedia player (PMP), a portable game player, a navigation device, a black box, a digital camera, a digital multimedia broadcasting (DMB) player, a smart television, a digital audio recorder, a digital audio player, a digital picture recorder, a digital picture player, a digital video recorder, a digital video player, a storage configuring a data center, one of various electronic devices configuring a home network, one of various electronic devices configuring a computer network, one of various electronic devices configuring a telematics network, an RFID (radio frequency identification) device, a mobility device (e.g., a vehicle, a robot or a drone) capable of traveling under human control or autonomous driving, etc.

The host may include at least one operating system (OS). The operating system may generally manage and control the function and operation of the host, and may provide interoperability between the host and the storage device 100. The operating system may be classified into a general operating system and a mobile operating system depending on the mobility of the host.

The controller 120 and the host may be devices that are separated from each other, or the controller 120 and the host may be implemented by being integrated into one device. Hereafter, for the sake of convenience in explanation, embodiments will be described with the controller 120 and the host separated from each other.

Referring to FIG. 1, the controller 120 may include a memory interface 122 and a control circuit 123, and may further include a host interface 121.

The host interface 121 provides an interface for communication with the host. For example, the host interface 121 provides an interface that uses at least one among various interface protocols such as a USB (universal serial bus) protocol, an MMC (multimedia card) protocol, a PCI (peripheral component interconnection) protocol, a PCI-E (PCI-express) protocol, an ATA (advanced technology attachment) protocol, a serial-ATA protocol, a parallel-ATA protocol, an SCSI (small computer system interface) protocol, an ESDI (enhanced small disk interface) protocol, an SMBus (system management bus) protocol, an I2C (inter-integrated circuit) protocol, an I3C (improved inter-integrated circuit) protocol, an IDE (integrated drive electronics) protocol, and a private protocol.

When receiving a command from the host, the control circuit 123 may receive the command through the host interface 121, and may perform an operation of processing the received command.

The memory interface 122 may be coupled with the memory 110 to provide an interface for communication with the memory 110. That is to say, the memory interface 122 may be configured to provide an interface between the memory 110 and the controller 120 in response to the control of the control circuit 123.

The control circuit 123 performs the general control operations of the controller 120 to control the operation of the memory 110. To this end, for instance, the control circuit 123 may include at least one of a processor 124 and a working memory 125, and may optionally include an error detection and correction circuit (ECC circuit) 126.

The processor 124 may control general operations of the controller 120, and may perform a logic calculation. The processor 124 may communicate with the host through the host interface 121, and may communicate with the memory 110 through the memory interface 122.

The processor 124 may perform the function of a flash translation layer (FTL). The processor 124 may translate a logical block address (LBA), provided by the host, into a physical block address (PBA) through the flash translation layer (FTL). The flash translation layer (FTL) may receive the logical block address (LBA) and translate the logical block address (LBA) into the physical block address (PBA), by using a mapping table.

There are various address mapping methods of the flash translation layer, depending on a mapping unit. Representative address mapping methods include a page mapping method, a block mapping method, and a hybrid mapping method.

The processor 124 may randomize data received from the host. For example, the processor 124 may randomize data received from the host by using a set randomizing seed. The randomized data may be provided to the memory 110, and may be programmed to a memory cell array of the memory 110.

In a read operation, the processor 124 may derandomize data received from the memory 110. For example, the processor 124 may derandomize data received from the memory 110 by using a derandomizing seed. The derandomized data may be outputted to the host.

The processor 124 may execute firmware to control the operation of the controller 120. Namely, in order to control the general operation of the controller 120 and perform a logic calculation, the processor 124 may execute (drive) firmware loaded in the working memory 125 upon booting. Hereafter, embodiments of an operation of the storage device 100 will be described as implemented in such a way that the processor 124 executes firmware in which the corresponding operation is defined.

Firmware, as a program to be executed in the storage device 100 to drive the storage device 100, may include various functional layers. For example, the firmware may include binary data in which codes for executing the functional layers, respectively, are defined.

For example, the firmware may include at least one from among a flash translation layer (FTL), which performs a translating function between a logical address requested to the storage device 100 from the host and a physical address of the memory 110; a host interface layer (HIL) which serves to analyze a command requested to the storage device 100 as a storage device from the host and transfer the command to the flash translation layer (FTL); and a flash interface layer (FIL) which transfers a command, instructed from the flash translation layer (FTL), to the memory 110.

Such firmware may be loaded in the working memory 125 from, for example, the memory 110 or a separate nonvolatile memory (e.g., a ROM or a NOR Flash) located outside the memory 110. The processor 124 may first load all or a part of the firmware in the working memory 125 when executing a booting operation after power-on.

The processor 124 may perform a logic calculation, which is defined in the firmware loaded in the working memory 125, to control the general operation of the controller 120. The processor 124 may store a result of performing the logic calculation defined in the firmware, in the working memory 125. The processor 124 may control the controller 120 according to a result of performing the logic calculation defined in the firmware such that the controller 120 generates a command or a signal. When a part of firmware, in which a logic calculation to be performed is defined, is stored in the memory 110 but is not loaded in the working memory 125, the processor 124 may generate an event (e.g., an interrupt) for loading the corresponding part of the firmware into the working memory 125 from the memory 110.

The processor 124 may load metadata necessary for driving firmware, from the memory 110. The metadata, as data for managing the memory 110, may include management information on user data stored in the memory 110.

Firmware may be updated while the storage device 100 is manufactured or while the storage device 100 is executed. The controller 120 may download new firmware from the outside of the storage device 100 and update existing firmware with the new firmware.

The working memory 125 may store firmware, a program code, a command and data that are necessary to drive the controller 120. A working memory 125 may be, for example, a volatile memory that includes at least one among an SRAM (static RAM), a DRAM (dynamic RAM), and an SDRAM (synchronous DRAM).

The error detection and correction circuit 126 may detect an error bit of target data and correct the detected error bit, by using an error correction code. The target data may be, for example, data stored in the working memory 125 or data read from the memory 110.

The error detection and correction circuit 126 may be implemented to decode data by using an error correction code. The error detection and correction circuit 126 may be implemented by various code decoders. For example, a decoder that performs unsystematic code decoding or a decoder that performs systematic code decoding may be used.

For example, the error detection and correction circuit 126 may detect an error bit by the unit of a set sector in each of read data. Each read data may be constituted by a plurality of sectors. A sector may mean a data unit that is smaller than a page, which is the read unit of a flash memory. Sectors constituting each read data may be matched with one another using an address.

The error detection and correction circuit 126 may calculate a bit error rate (BER), and may determine whether an error is correctable or not by units of sectors. For example, when a bit error rate (BER) is higher than a set reference value, the error detection and correction circuit 126 may determine that a corresponding sector is uncorrectable or a fail. On the other hand, when a bit error rate (BER) is lower than the reference value, the error detection and correction circuit 126 may determine that a corresponding sector is correctable or a pass.

The error detection and correction circuit 126 may perform an error detection and correction operation sequentially for all read data. In the case where a sector included in read data is correctable, the error detection and correction circuit 126 may omit an error detection and correction operation for a corresponding sector for next read data. If the error detection and correction operation for all read data is ended in this way, then the error detection and correction circuit 126 may detect an uncorrectable sector. There may be one or more sectors that are determined to be uncorrectable. The error detection and correction circuit 126 may transfer information (for example, address information) regarding a sector which is determined to be uncorrectable, to the processor 124.

A bus 127 may be configured to provide channels among the components 121, 122, 124, 125 and 126 of the controller 120. The bus 127 may include, for example, a control bus for transferring various control signals, commands and the like, a data bus for transferring various data, and so forth.

Some of the components among the above-described components 121, 122, 124, 125 and 126 of the controller 120 may be omitted, or some of the components among the above-described components 121, 122, 124, 125 and 126 of the controller 120 may be integrated into one component. In other embodiments, one or more other components may be added in addition to the above-described components 121, 122, 124, 125 and 126 of the controller 120.

Hereinbelow, the memory 110 will be described in further detail with reference to FIG. 2.

Figure 2:
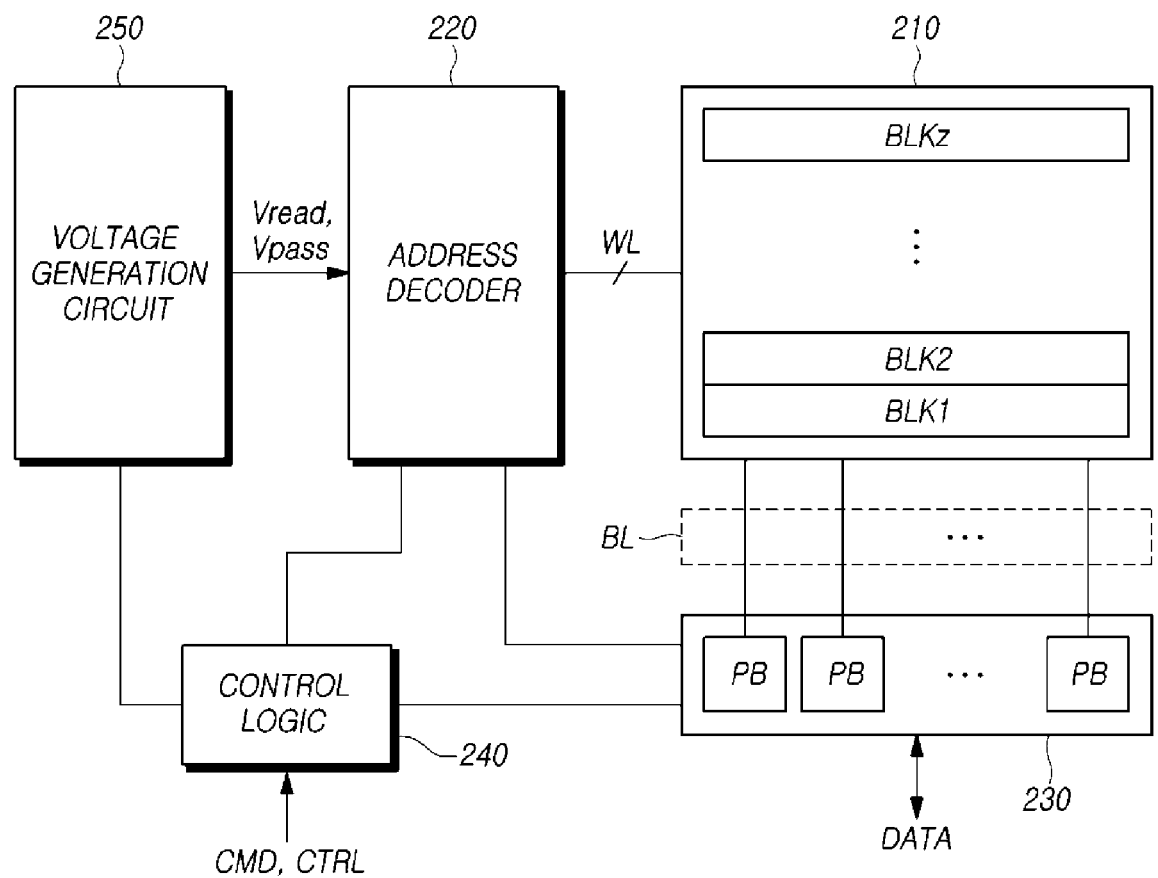
FIG. 2 is a block diagram schematically illustrating a memory of FIG. 1.

FIG. 2 is a diagram schematically illustrating a memory 110 of FIG. 1.

Referring to FIG. 2, a memory 110 may include a memory cell array 210, an address decoder 220, a read and write circuit 230, a control logic 240, and a voltage generation circuit 250.

The memory cell array 210 may include a plurality of memory blocks BLK1 to BLKz (where z is a natural number of 2 or greater).

In the plurality of memory blocks BLK1 to BLKz, a plurality of word lines WL and a plurality of bit lines BL may be disposed, and a plurality of memory cells (MC) may be arranged.

The plurality of memory blocks BLK1 to BLKz may be coupled with the address decoder 220 through the plurality of word lines WL. The plurality of memory blocks BLK1 to BLKz may be coupled with the read and write circuit 230 through the plurality of bit lines BL.

Each of the plurality of memory blocks BLK1 to BLKz may include a plurality of memory cells. For example, the plurality of memory cells may be nonvolatile memory cells, and may be configured by nonvolatile memory cells that have vertical channel structures.

The memory cell array 210 may be configured by a memory cell array of a two-dimensional structure or may be configured by a memory cell array of a three-dimensional structure.

Each of the plurality of memory cells included in the memory cell array 210 may store at least 1-bit data. For instance, each of the plurality of memory cells included in the memory cell array 210 may be a signal level cell (SLC) that stores 1-bit data. In another instance, each of the plurality of memory cells included in the memory cell array 210 may be a multi-level cell (MLC) that stores 2-bit data. For still another instance, each of the plurality of memory cells included in the memory cell array 210 may be a triple level cell (TLC) that stores 3-bit data. In yet another instance, each of the plurality of memory cells included in the memory cell array 210 may be a quad level cell (QLC) that stores 4-bit data. In a further instance, the memory cell array 210 may include a plurality of memory cells, each of which stores 5 or more-bit data.

The number of bits of data stored in each of the plurality of memory cells may be dynamically determined. For example, a single-level cell that stores 1-bit data may be changed to a triple-level cell that stores 3-bit data.

Referring to FIG. 2, the address decoder 220, the read and writhe circuit 230, the control logic 240 and the voltage generation circuit 250 may operate as a peripheral circuit that drives the memory cell array 210.

The address decoder 220 may be coupled to the memory cell array 210 through the plurality of word lines WL.

The address decoder 220 may be configured to operate in response to the control of the control logic 240.

The address decoder 220 may receive an address through an input/output buffer in the memory 110. The address decoder 220 may be configured to decode a block address in the received address. The address decoder 220 may select at least one memory block depending on the decoded block address.

The address decoder 220 may receive a read voltage Vread and a pass voltage Vpass from the voltage generation circuit 250.

During a read operation, the address decoder 220 may apply the read voltage Vread to a selected word line WL in a selected memory block in a read voltage applying operation. The address decoder 220 may apply the pass voltage Vpass to the remaining unselected word lines WL.

The address decoder 220 may apply a verify voltage generated in the voltage generation circuit 250 to a selected word line WL in a selected memory block in a program verify operation, and may apply the pass voltage Vpass to the remaining unselected word lines WL.

The address decoder 220 may be configured to decode a column address in the received address. The address decoder 220 may transmit the decoded column address to the read and write circuit 230.

A read operation and a program operation of the memory 110 may be performed by the unit of a page. An address received when a read operation or a program operation is requested may include at least one from among a block address, a row address and a column address.

The address decoder 220 may select one memory block and one word line depending on a block address and a row address. A column address may be decoded by the address decoder 220 and be provided to the read and write circuit 230.

The address decoder 220 may include at least one from among a block decoder, a row decoder, a column decoder and an address buffer.

The read and write circuit 230 may include a plurality of page buffers PB. The read and write circuit 230 may operate as a read circuit in a read operation of the memory cell array 210, and may operate as a write circuit in a write operation of the memory cell array 210.

The read and write circuit 230 described above may also be referred to as a page buffer circuit or a data register circuit that includes a plurality of page buffers PB. The read and write circuit 230 may include data buffers that take charge of a data processing function, and may further include cache buffers that take charge of a caching function.

The plurality of page buffers PB may be coupled to the memory cell array 210 through the plurality of bit lines BL. The plurality of page buffers PB may continuously supply sensing current to bit lines BL coupled with memory cells to sense threshold voltages (Vth) of the memory cells in a read operation and a program verify operation, and may latch sensing data by sensing, through sensing nodes, changes in the amounts of current flowing depending on the programmed states of the corresponding memory cells.

The read and write circuit 230 may operate in response to page buffer control signals outputted from the control logic 240.

In a read operation, the read and write circuit 230 temporarily stores read data by sensing data of memory cells, and then, outputs data DATA to the input/output buffer of the memory 110. As an exemplary embodiment, the read and write circuit 230 may include a column select circuit in addition to the page buffers PB or the page registers.

The control logic 240 may be coupled with the address decoder 220, the read and write circuit 230 and the voltage generation circuit 250. The control logic 240 may receive a command CMD and a control signal CTRL through the input/output buffer of the memory 110.

The control logic 240 may be configured to control general operations of the memory 110 in response to the control signal CTRL. The control logic 240 may output control signals for adjusting the precharge potential levels of the sensing nodes of the plurality of page buffers PB.

The control logic 240 may control the read and write circuit 230 to perform a read operation of the memory cell array 210. The voltage generation circuit 250 may generate the read voltage Vread and the pass voltage Vpass used in a read operation, in response to a voltage generation circuit control signal outputted from the control logic 240.

Each memory block of the memory 110 described above may be configured by a plurality of pages corresponding to a plurality of word lines WL and a plurality of strings corresponding to a plurality of bit lines BL.

In a memory block BLK, a plurality of word lines WL and a plurality of bit lines BL may be disposed to intersect with each other. For example, each of the plurality of word lines WL may be disposed in a row direction, and each of the plurality of bit lines BL may be disposed in a column direction. For another example, each of the plurality of word lines WL may be disposed in a column direction, and each of the plurality of bit lines BL may be disposed in a row direction.

A memory cell may be coupled to one of the plurality of word lines WL and one of the plurality of bit lines BL. A transistor may be disposed in each memory cell.

For example, a transistor disposed in each memory cell (MC) may include a drain, a source and a gate. The drain (or source) of the transistor may be coupled with a corresponding bit line BL directly or via another transistor. The source (or drain) of the transistor may be coupled with a source line (which may be the ground) directly or via another transistor. The gate of the transistor may include a floating gate which is surrounded by a dielectric, and a control gate to which a gate voltage is applied from a word line WL.

In each memory block, a first select line (also referred to as a source select line or a drain select line) may be additionally disposed outside a first outermost word line more adjacent to the read and write circuit 230 between two outermost word lines, and a second select line (also referred to as a drain select line or a source select line) may be additionally disposed outside a second outermost word line between the two outermost word lines.

At least one dummy word line may be additionally disposed between the first outermost word line and the first select line. At least one dummy word line may also be additionally disposed between the second outermost word line and the second select line.

A read operation and a program operation (write operation) of the memory block described above may be performed by the unit of a page, and an erase operation may be performed by the unit of a memory block.

Figure 3:
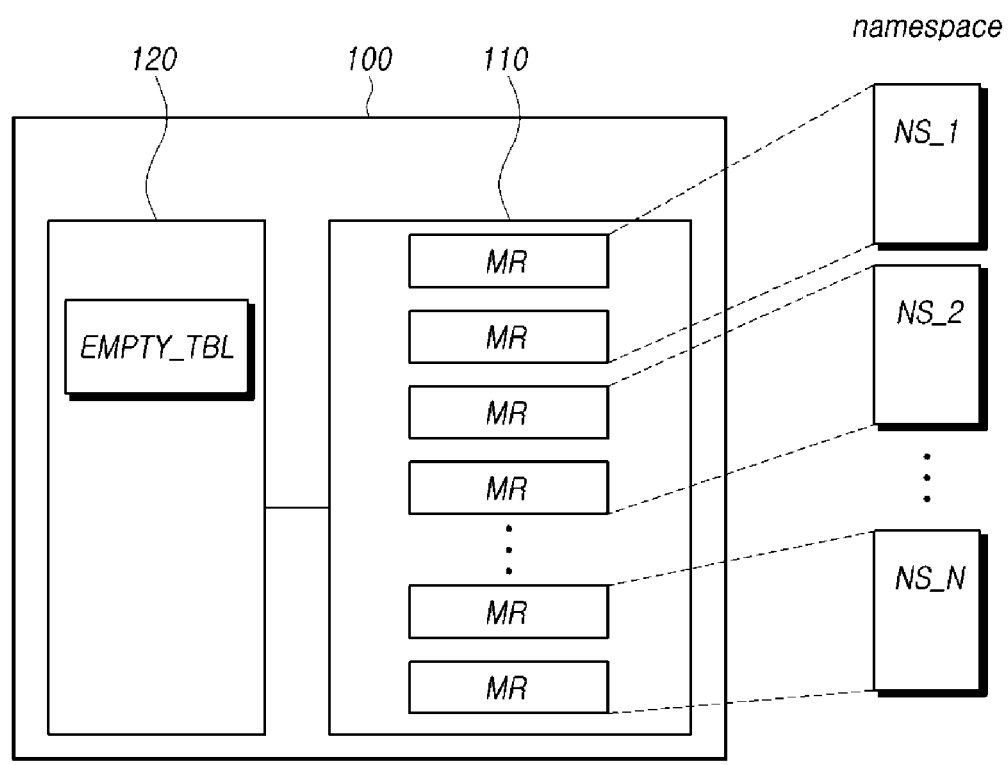
FIG. 3 is a diagram illustrating a structure of a storage device according to an embodiment of the disclosure.

FIG. 3 is a diagram illustrating a structure of a storage device according to an embodiment of the disclosure.

Referring to FIG. 3, a storage device 100 may include a memory 110 and a controller 120.

The memory 110 may include a plurality of memory regions MR. Each of the plurality of memory regions MR is a region capable of storing data of a specific size (e.g., 1 GB). Each of the plurality of memory regions MR may be constituted by one or more memory blocks or one or more pages.

The controller 120 may generate mapping information between the plurality of memory regions MR and an N (where N is a natural number) number of namespaces NS_1, NS_2, . . . , and NS_N. All or a part of the plurality of memory regions MR may be mapped to one of the namespaces NS_1, NS_2, . . . , and NS_N as logical partitions. When data is stored in a specific namespace, the corresponding data is actually stored in memory regions which are mapped to the corresponding namespace.

The namespaces NS_1, NS_2, . . . , and NS_N may be dynamically created or deleted by an external device (not illustrated).

When a namespace is created or deleted, a mapping relationship between the namespace and memory regions MR may also be changed.

The controller 120 may record information on empty memory regions among the plurality of memory regions MR in an empty table EMPTY_TBL.

Each empty memory region is a memory region, among the plurality of memory regions MR, that is not mapped to any namespace. In the embodiment of the disclosed technology, remaining memory regions other than memory regions that are mapped to any one of the namespaces NS_1, NS_2, . . . , and NS_N may be determined as empty memory regions.

Meanwhile, memory blocks or pages included in an empty memory region may be in an erased state.

When a specific namespace is newly created by the external device (not illustrated), all or a part of empty memory regions may be mapped to the corresponding namespace. Each empty memory region mapped to the corresponding namespace is excluded from empty memory regions thereafter.

On the other hand, when a specific namespace is deleted, each memory region mapped to the corresponding namespace may become an empty memory region again.

The controller 120 may determine and manage empty memory regions from among the plurality of memory regions MR in various ways. For example, the controller 120 may use a bitmap indicating whether each of the plurality of memory regions MR is an empty memory region.

The mapping relationship between the namespaces NS_1, NS_2, . . . , and NS_N and the memory regions MR, and the configuration of the associated empty table EMPTY_TBL will be described below in detail with reference to FIG. 4.

In an embodiment, a target namespace with a target size (e.g., 3 GB) may be created.

The target namespace may be one of the N number of namespaces NS_1, NS_2, . . . , and NS_N, or may be a namespace that is created in addition to the N number of namespaces NS_1, NS_2, . . . , and NS_N. The target namespace may be created by the aforementioned external device, and the target size may also be set by the external device.

When the target namespace of the target size is created, the controller 120 may determine empty memory regions, from among empty memory regions recorded in the empty table EMPTY_TBL, to be mapped to the target namespace.

An example in which the controller 120 determines empty memory regions to be mapped to the target namespace will be described later in detail through drawings.

Figure 4:
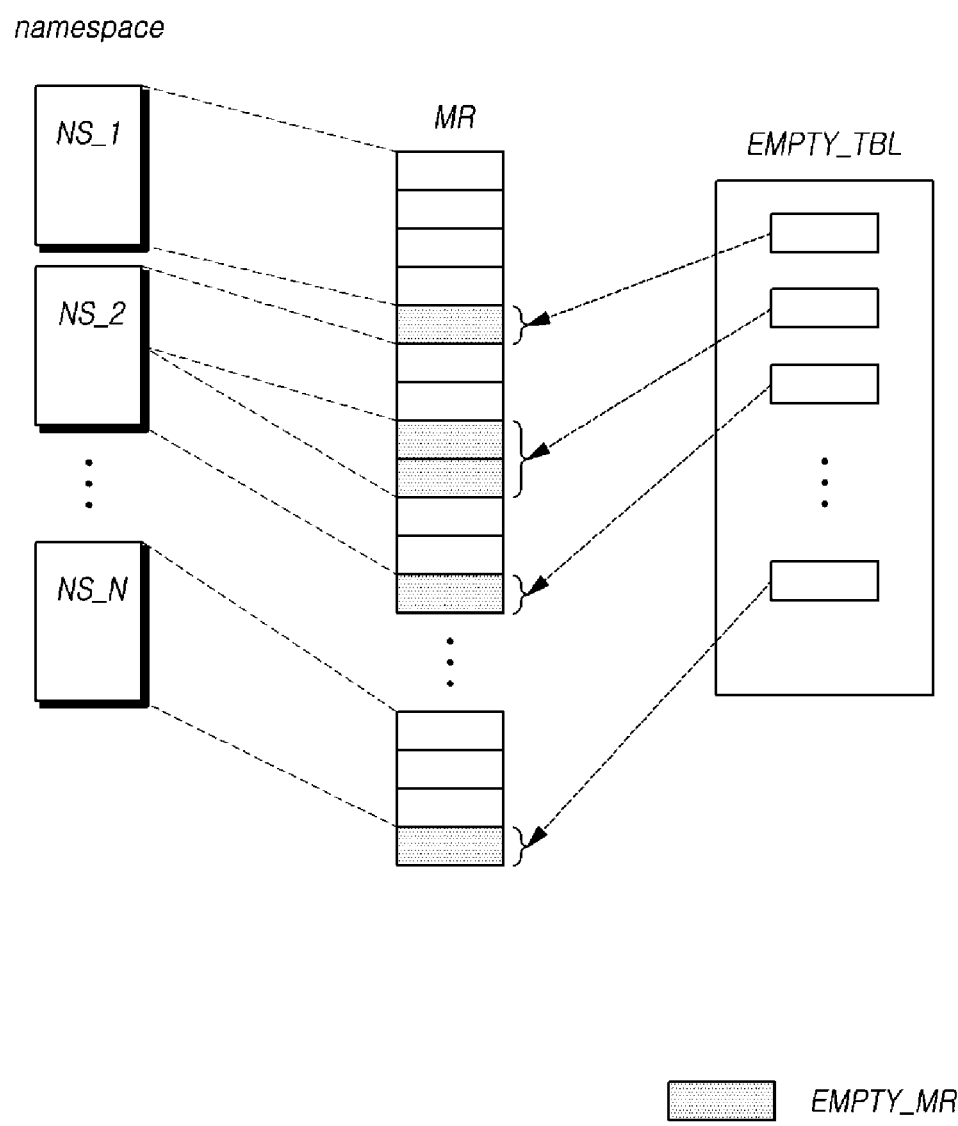
FIG. 4 is a diagram illustrating a mapping relationship between namespaces and memory regions according to an embodiment of the disclosure.

FIG. 4 is a diagram illustrating a mapping relationship between namespaces NS and memory regions according to an embodiment of the disclosure.

Referring to FIG. 4, each of the N number of namespaces NS_1, NS_2, . . . , and NS_N may be mapped to one or more memory regions. Memory regions mapped to each namespace may be sequential or non-sequential.

In sequential memory regions, a physical address range corresponding to the entirety of the memory regions may be expressed as one physical address range, and the memory regions are consecutive to each other.

On the other hand, in non-sequential memory regions, a physical address range corresponding to the entirety of the memory regions is expressed by two or more non-consecutive physical address ranges, and some of the memory regions are non-consecutive to each other.

In FIG. 4, memory regions mapped to a namespace NS_1 are sequential. On the other hand, memory regions mapped to a namespace NS_2 are non-sequential.

Empty memory regions EMPTY_MR that are not mapped to any namespace among the N number of namespaces NS_1, NS_2, . . . , and NS_N among the plurality of memory regions MR may exist.

As described above, information on empty memory regions EMPTY_MR may be recorded in empty table EMPTY_TBL.

For example, the empty table EMPTY_TBL may include information on the empty memory regions EMPTY_MR (e.g., locations and sizes of the empty memory regions EMPTY_MR).

Figure 5:
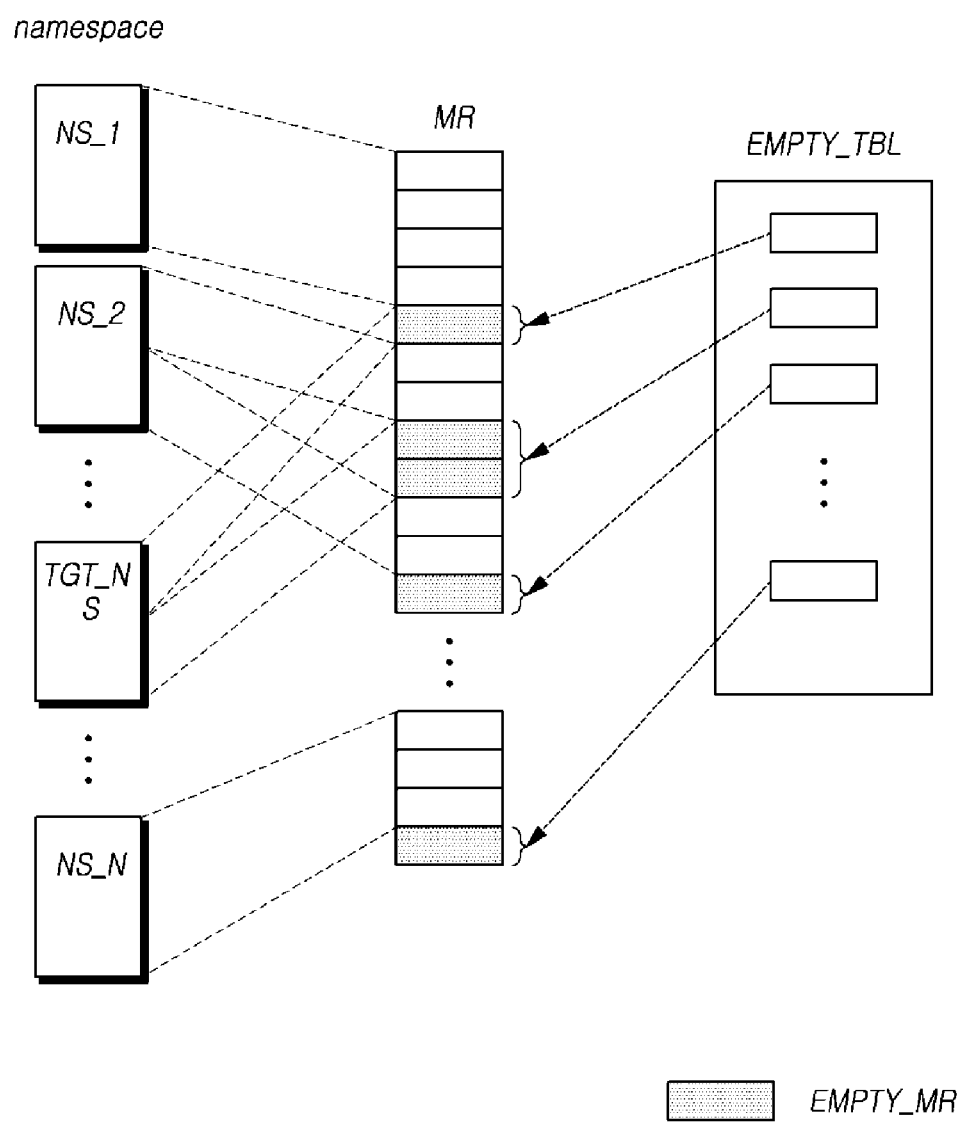
FIG. 5 is a diagram illustrating a mapping relationship between a target namespace and memory regions according to an embodiment of the disclosure.

FIG. 5 is a diagram illustrating a mapping relationship between a target namespace and memory regions according to an embodiment of the disclosure.

FIG. 5 describes a new target namespace TGT_NS created by the external device.

Memory regions MR to be mapped to the target namespace TGT_NS may be determined from among empty memory regions EMPTY_MR. In FIG. 5, memory regions MR mapped to the target namespace TGT_NS are non-sequential, but memory regions mapped to the target namespace TGT_NS may be sequential.

In order to determine empty memory regions EMPTY_MR to be mapped to the target namespace TGT_NS, the controller 120 may use information recorded in an empty table EMPTY_TBL.

Hereinafter, an example of a structure of the empty table EMPTY_TBL and examples of an operation in which the controller 120 of the storage device 100 determines empty memory regions EMPTY_MR to be mapped to the target namespace TGT_NS will be described through drawings.

Figure 6:
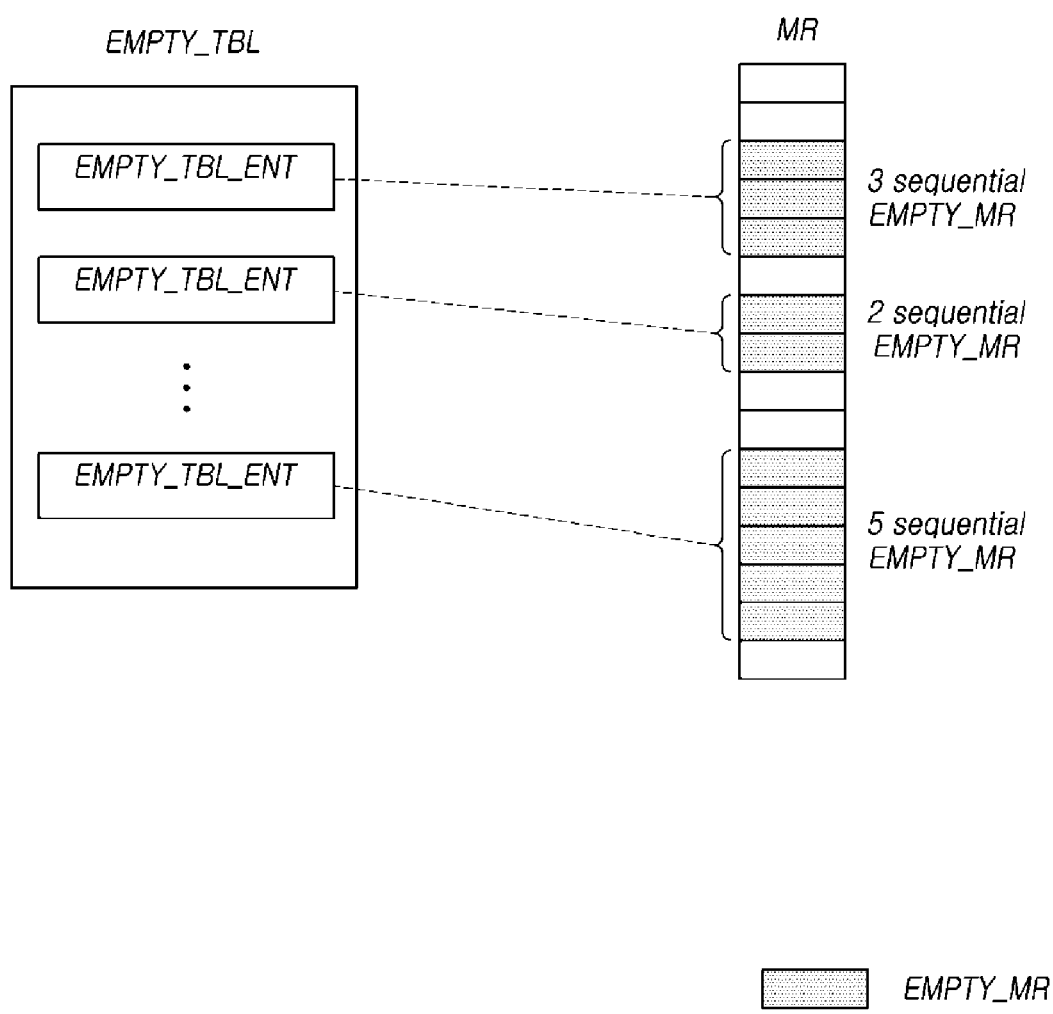
FIG. 6 is a diagram illustrating an example of a structure of an empty table according to an embodiment of the disclosure.

FIG. 6 is a diagram illustrating an example of a structure of an empty table according to an embodiment of the disclosure.

Referring to FIG. 6, the empty table EMPTY_TBL may include one or more empty table entries EMPTY_TBL_ENT.

Each of the empty table entries EMPTY_TBL_ENT may correspond to one or more sequential empty memory regions EMPTY_MR. In FIG. 6, empty table entries EMPTY_TBL_ENT correspond to three, two and five sequential empty memory regions EMPTY_MR, respectively.

Figure 7:
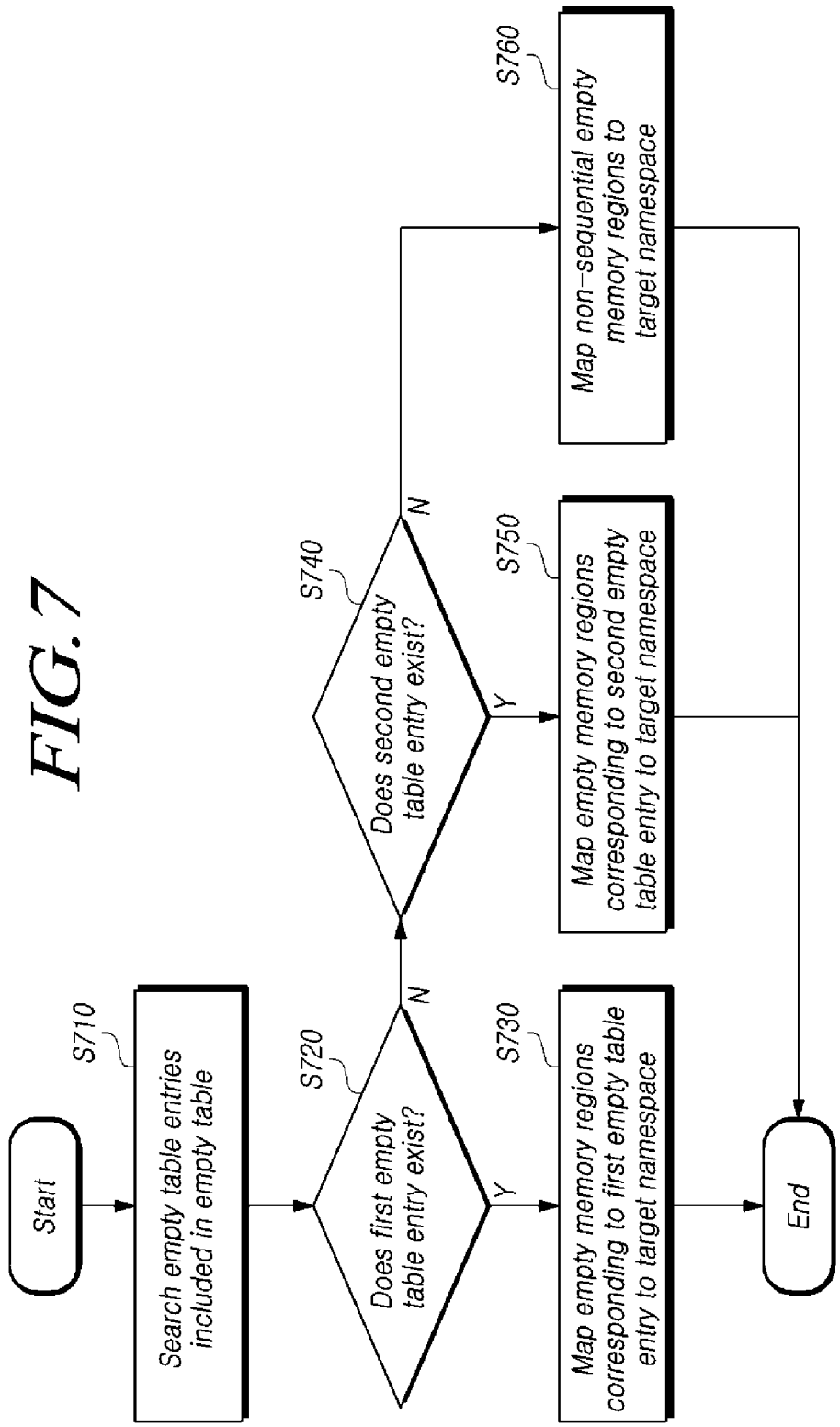
FIG. 7 is a flowchart illustrating an example of an operation in which the storage device determines empty memory regions to be mapped to a target namespace according to an embodiment of the disclosure.

FIG. 7 is a flowchart illustrating an example of an operation in which the storage device determines empty memory regions to be mapped to a target namespace according to an embodiment of the disclosure.

The controller 120 of the storage device 100 may search empty table entries EMPTY_TBL_ENT included in an empty table EMPTY_TBL (S710).

The controller 120 determines whether a first empty table entry exists among the empty table entries EMPTY_TBL_ENT (S720). The first empty table entry is an empty table entry in which the total sum of the sizes of corresponding empty memory regions matches the target size, as the size of a target namespace TGT_NS.

When the first empty table entry exists (S720-Y), the controller 120 may map empty memory regions corresponding to the first empty table entry to the target namespace TGT_NS (S730). At this time, the empty memory regions mapped to the target namespace TGT_NS are sequential.

On the other hand, when the first empty table entry does not exist (S720-N), the controller 120 determines whether a second empty table entry exists (S740). The second empty table entry is an empty table entry in which the total sum of the sizes of corresponding empty memory regions is larger than the target size.

When the second empty table entry exists (S740-Y), the controller 120 may map some of empty memory regions corresponding to the second empty table entry to the target namespace TGT_NS (S750). At this time, the empty memory regions mapped to the target namespace TGT_NS are sequential.

On the other hand, when the second empty table entry does not exist (S740-N), the controller 120 may map one or more empty memory regions among the empty memory regions recorded in the empty table EMPTY_TBL to the target namespace TGT_NS (S760). In this case, the empty memory regions mapped to the target namespace TGT_NS are non-sequential.

For example, at the step S760, the controller 120 may determine the empty memory regions to be mapped to the target namespace TGT_NS according to the order of identifiers of the empty memory regions recorded in the empty table EMPTY_TBL.

In another example, at the step S760, the controller 120 may randomly determine the empty memory regions to be mapped to the target namespace TGT_NS among the empty memory regions recorded in the empty table EMPTY_TBL.

In a further example, at the step S760, the controller 120 may determine the empty memory regions to be mapped to the target namespace TGT_NS according to the total sum of the sizes of empty memory regions corresponding to each empty table entry EMPTY_TBL_ENT. The controller 120 may select, among the empty table entries EMPTY_TBL_ENT, an empty table entry having a large magnitude with respect to the total sum of the sizes of corresponding empty memory regions with a high priority, and may map empty memory regions corresponding to a selected empty table entry to the target namespace TGT_NS.

In embodiments of the disclosed technology, as the controller 120 determines empty memory regions to be mapped to the target namespace TGT_NS as in the methods described above with reference to FIG. 7, it is possible to set the empty memory regions to be mapped to the target namespace TGT_NS so that the empty memory regions are maximally sequential. In addition, after the controller 120 maps empty memory regions to the target namespace TGT_NS, fragmentation of the remaining empty memory regions may be minimized.

Figure 8:
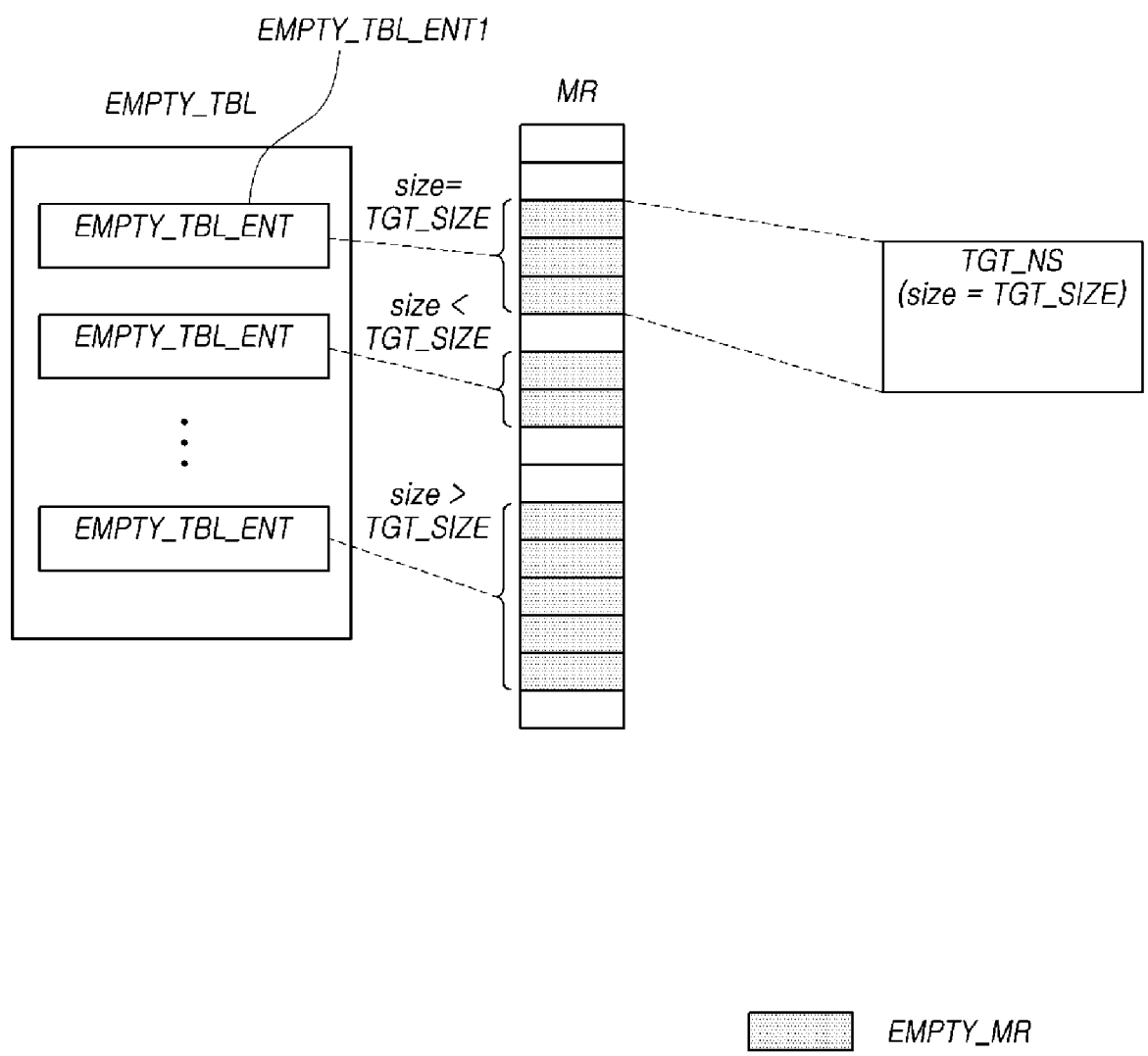
FIG. 8 is a diagram illustrating an example of empty memory regions mapped to a target namespace according to an embodiment of the disclosure.

FIG. 8 is a diagram illustrating an example of empty memory regions mapped to a target namespace according to an embodiment of the disclosure.

Referring to FIG. 8, a total sum of the sizes of empty memory regions corresponding to a first empty table entry EMPTY_TBL_ENT1, among the empty table entries EMPTY_TBL_ENT included in the empty table EMPTY_TBL, matches a target size TGT_SIZE as the size of a target namespace TGT_NS.

Accordingly, the controller 120 may map the empty memory regions corresponding to the first empty table entry EMPTY_TBL_ENT1 to the target namespace TGT_NS.

Since the empty memory regions corresponding to the first empty table entry EMPTY_TBL_ENT1 are sequential, memory regions is mapped to the target namespace TGT_NS are sequential.

Thereafter, the first empty table entry EMPTY_TBL_ENT1 may be removed from the empty table EMPTY_TBL. This is because the empty memory regions corresponding to the first empty table entry EMPTY_TBL_ENT1 are no longer empty memory regions after they are mapped to the target namespace TGT_NS.

Figure 9:
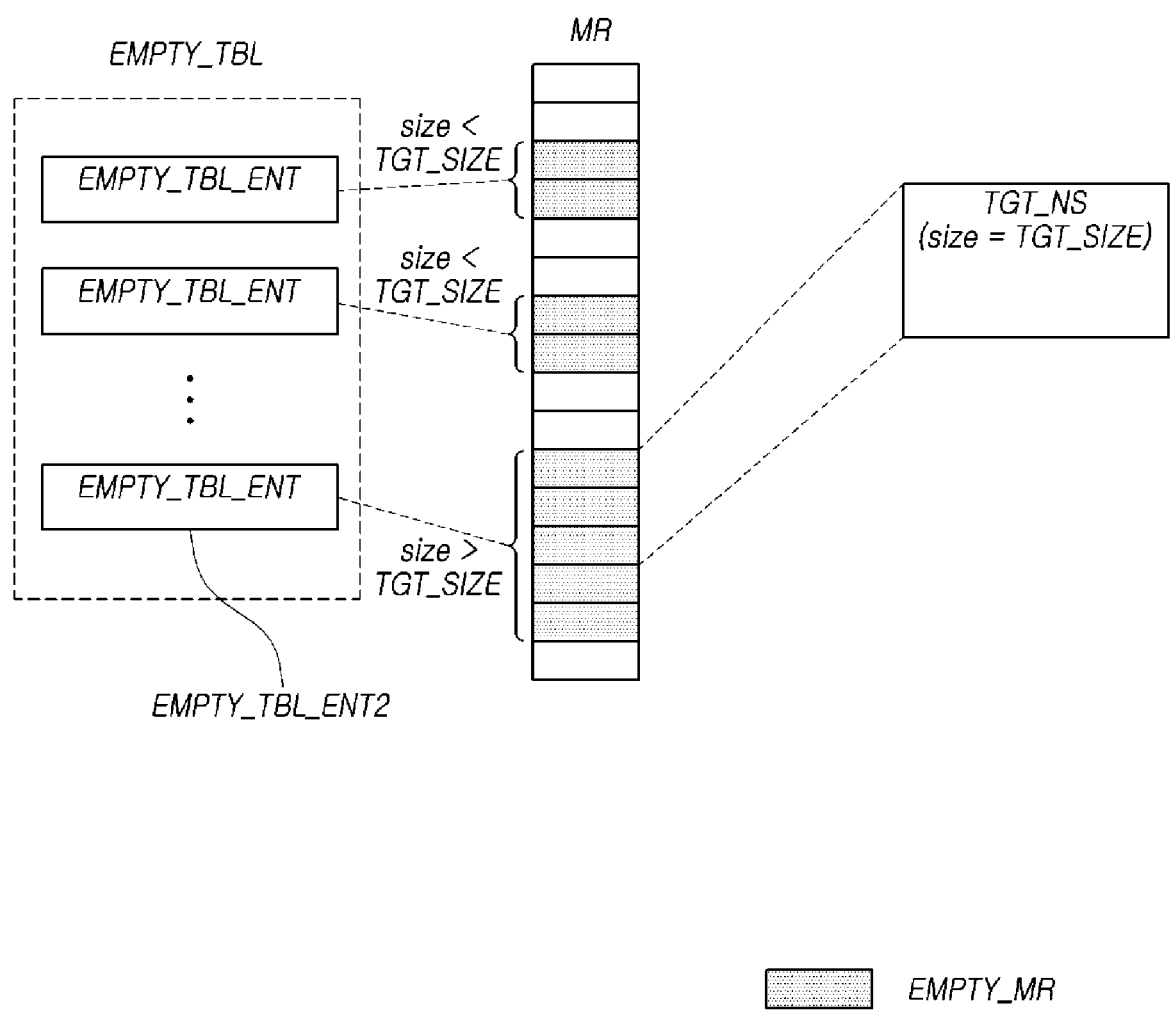
FIG. 9 is a diagram illustrating another example of empty memory regions mapped to a target namespace according to an embodiment of the disclosure.

FIG. 9 is a diagram illustrating another example of empty memory regions mapped to a target namespace according to an embodiment of the disclosure.

Referring to FIG. 9, a total sum of the sizes of empty memory regions corresponding to a second empty table entry EMPTY_TBL_ENT2, among the empty table entries EMPTY_TBL_ENT included in the empty table EMPTY_TBL, is larger than a target size TGT_SIZE as the size of a target namespace TGT_NS.

Accordingly, the controller 120 may map some of the empty memory regions corresponding to the second empty table entry EMPTY_TBL_ENT2 to the target namespace TGT_NS.

Among the empty memory regions corresponding to the second empty table entry EMPTY_TBL_ENT2, the memory regions mapped to the target namespace TGT_NS are sequential.

Thereafter, the second empty table entry EMPTY_TBL_ENT2 may be mapped to remaining empty memory regions other than the empty memory regions mapped to the target namespace TGT_NS, from among the empty memory regions previously corresponding thereto.

Figure 10:
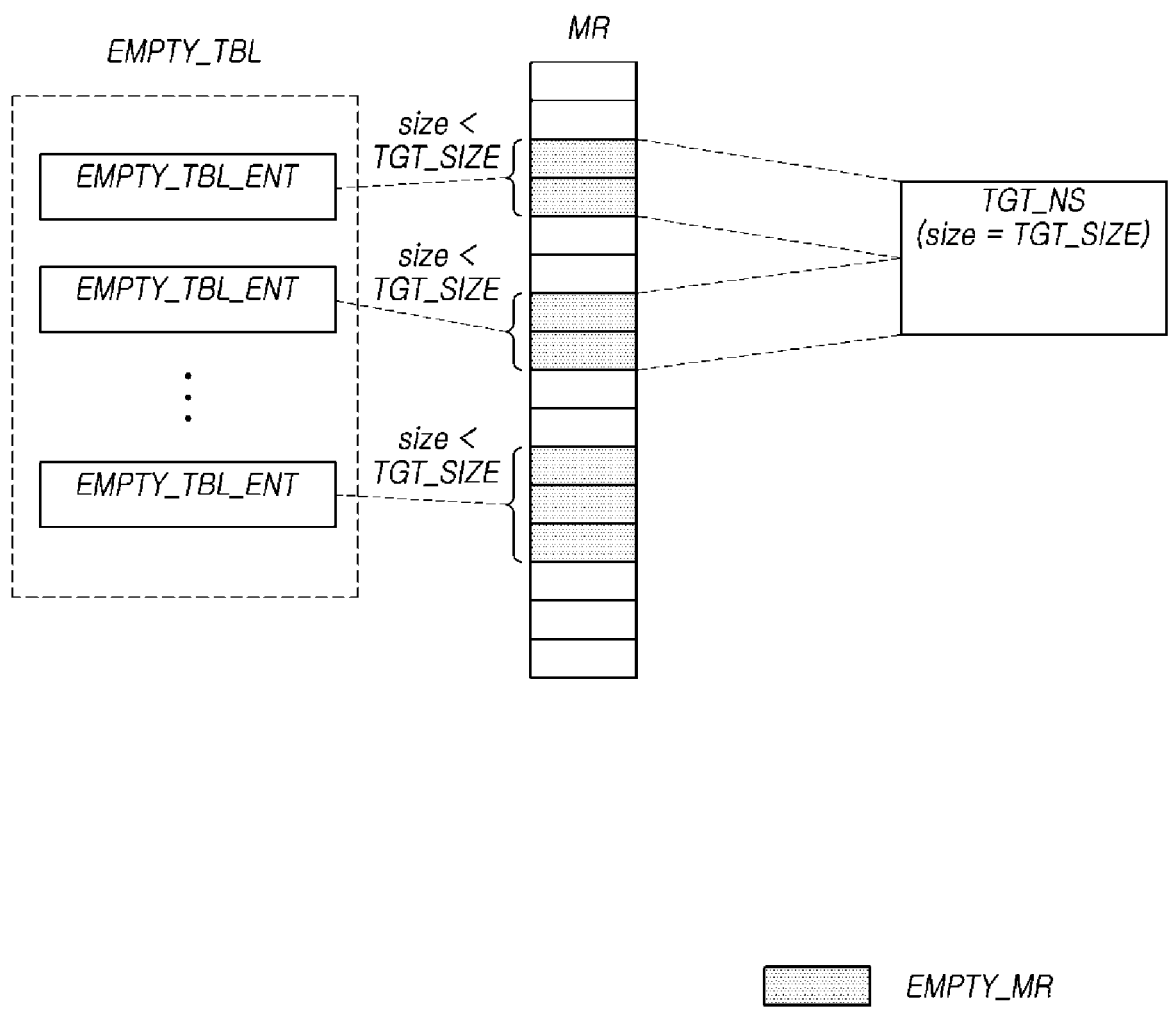
FIG. 10 is a diagram illustrating still another example of empty memory regions mapped to a target namespace according to an embodiment of the disclosure.

FIG. 10 is a diagram illustrating still another example of empty memory regions mapped to a target namespace according to an embodiment of the disclosure.

Referring to FIG. 10, a total sum of the sizes of empty memory regions corresponding to each of the empty table entries EMPTY_TBL_ENT included in an empty table EMPTY_TBL is smaller than a target size TGT_SIZE as the size of a target namespace TGT_NS. In FIG. 10, the total sums of the sizes of empty memory regions corresponding to the empty table entries EMPTY_TBL_ENT included in the empty table EMPTY_TBL are MR*2, MR*2 and MR*3, respectively, and are smaller than the target size TGT_SIZE of MR*4.

Accordingly, the controller 120 may map one or more empty memory regions among the empty memory regions recorded in the empty table EMPTY_TBL to the target namespace TGT_NS.

At this time, the empty memory regions mapped to the target namespace TGT_NS are non-sequential.

An operation of determining empty memory regions to be mapped to the target namespace TGT_NS has been described above.

Hereinafter, the operation of the storage device 100 according to whether memory regions mapped to the target namespace TGT_NS are sequential or non-sequential will be described.

FIG. 11 is a diagram illustrating flags for target namespaces according to an embodiment of the disclosure.

In FIG. 11, a controller 120 of a storage device 100 may is differently set a flag FLG corresponding to a target namespace TGT_NS according to whether empty memory regions mapped to a target namespace TGT_NS are sequential or non-sequential.

When empty memory regions mapped to the target namespace TGT_NS are sequential, the controller 120 may set the flag FLG corresponding to the target namespace TGT_NS as a first flag FLG_1.

On the other hand, when empty memory regions mapped to the target namespace TGT_NS are non-sequential, the controller 120 may set the flag FLG corresponding to the target namespace TGT_NS as a second flag FLG_2.

The controller 120 may manage flags FLG for respective namespaces NS through a separate data structure (e.g., a table). The controller 120 may search for an element corresponding to the target namespace TGT_NS in the corresponding data structure, and may record whether the flag FLG corresponding to the target namespace TGT_NS is the first flag FLG_1 or the second flag FLG_2, in the corresponding element.

Afterwards, according to the flag FLG corresponding to the target namespace TGT_NS, the controller 120 may translate a physical address mapped to a logical address corresponding to the target namespace TGT_NS. Hereinafter, this will be described in detail with reference to FIGS. 12 and 13.

Figure 12:
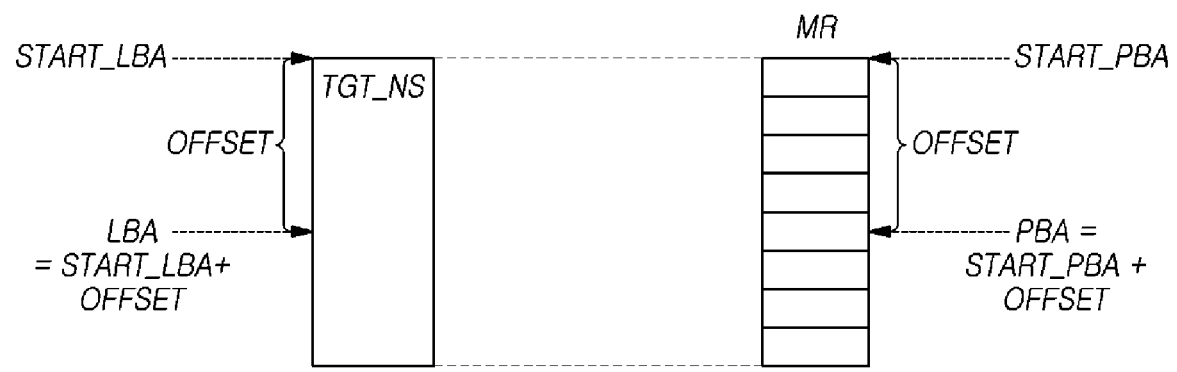
FIG. 12 is a diagram illustrating an example of an operation in which a storage device determines a physical address mapped to a logical address according to an embodiment of the disclosure.

FIG. 12 is a diagram illustrating an example of an operation in which a storage device determines a physical address PBA mapped to a logical address LBA according to an embodiment of the disclosure.

In FIG. 12, a flag FLG corresponding to a target namespace TGT_NS is a first flag FLG_1. At this time, memory regions MR mapped to a target namespace TGT_NS are sequential.

A logical address LBA corresponding to the target namespace TGT_NS may be expressed as a sum of a start logical address START_LBA of the target namespace TGT_NS and an offset OFFSET.

For example, when the logical address LBA is 150 and a start logical address START_LBA of the target namespace TGT_NS is 100, the offset OFFSET may be determined as 50.

In FIG. 12, the start logical address START_LBA of the target namespace TGT_NS may correspond to a start physical address START_PBA of the memory regions MR mapped to the target namespace TGT_NS. The memory regions MR mapped to the target namespace TGT_NS are sequential.

Accordingly, a controller 120 of a storage device 100 may determine a physical address PBA corresponding to the logical address LBA as the sum of the start physical address START_PBA and the offset OFFSET.

In the above example, when assuming that the start physical address START_PBA is 300, the physical address PBA corresponding to the logical address LBA of 150 may be determined as 350, which is the sum of the start physical address START_PBA of 300 and the offset OFFSET of 50.

That is to say, the controller 120 may determine the physical address PBA corresponding to the logical address LBA on the basis of the offset OFFSET of the logical address LBA in the target namespace TGT_NS.

In this case, when searching for the physical address PBA corresponding to the logical address LBA, without the necessity of searching a separate data structure (e.g., a table) in which the mapping information between the logical address LBA and the physical address PBA is stored, the physical address PBA corresponding to the logical address LBA may be calculated directly through an operation using the offset OFFSET. Therefore, an overhead in the process of searching for the physical address PBA corresponding to the logical address LBA may be minimized.

Figure 13:
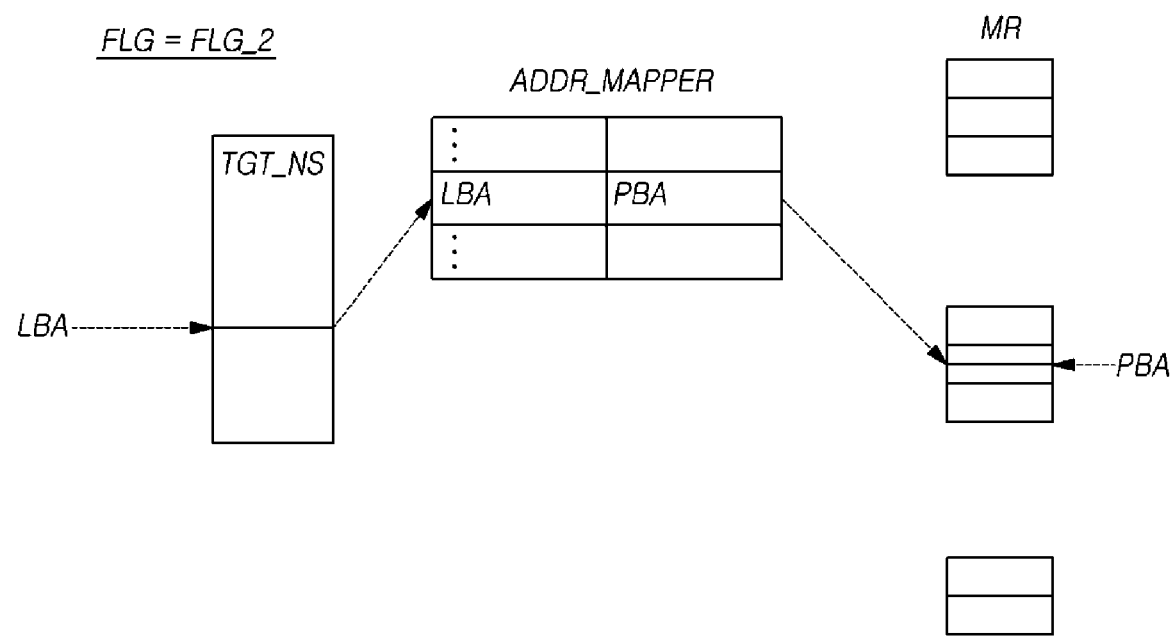
FIG. 13 is a diagram illustrating another operation in which a storage device determines a physical address mapped to a logical address according to an embodiment of the disclosure.

FIG. 13 is a diagram illustrating another operation in which a storage device determines a physical address PBA mapped to a logical address LBA according to an embodiment of the disclosure.

In FIG. 13, a flag FLG corresponding to a target namespace TGT_NS is a second flag FLG_2. At this time, memory regions MR mapped to the target namespace TGT_NS are non-sequential. Therefore, address translation using an offset as in the method described above with reference to FIG. 12 is impossible.

Accordingly, a controller 120 may use an address mapper ADDR_MAPPER to determine a physical address PBA mapped to a is logical address LBA.

The address mapper ADDR_MAPPER is a data structure (e.g., a table or a list) indicating the mapping information associated with the logical address LBA and the physical address PBA.

In this case, since the controller 120 performs address translation by referring to the address mapper ADDR_MAPPER, it may take a longer time to determine the physical address PBA corresponding to the logical address LBA compared to the offset-based operation described above with reference to FIG. 12.

Figure 14:
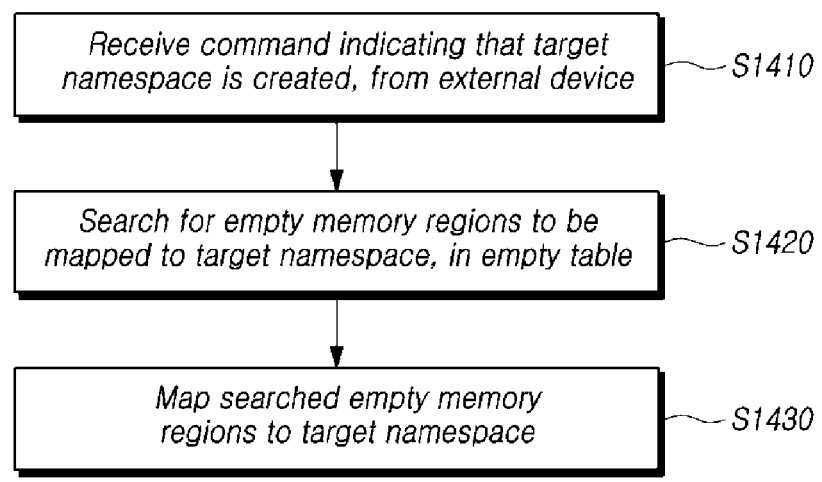
FIG. 14 is a diagram illustrating a method for operating a storage device according to an embodiment of the disclosure.

FIG. 14 is a diagram illustrating a method for operating a storage device according to an embodiment of the disclosure.

Referring to FIG. 14, a method for operating a storage device 100 may include receiving, from an external device, a command indicating that a target namespace TGT_NS having a target size TGT_SIZE has been created (S1410).

The method for operating the storage device 100 may include searching for empty memory regions EMPTY_MR to be mapped to a target namespace TGT_NS in an empty table EMPTY_TBL, in which information is recorded on empty memory regions EMPTY_MR not mapped to any namespace, from among a plurality of memory regions MR (S1420).

The empty table EMPTY_TBL may include one or more empty table entries EMPTY_TBL_ENT. Each of the empty table entries EMPTY_TBL_ENT may correspond to one or more sequential empty is memory regions EMPTY_MR.

For example, when a first empty table entry EMPTY_TBL_ENT1, in which the total sum of the sizes of corresponding empty memory regions EMPTY_MR matches the target size TGT_SIZE, exists among the empty table entries EMPTY_TBL_ENT, the step S1420 may determine the empty memory regions EMPTY_MR corresponding to the first empty table entry EMPTY_TBL_ENT1 as empty memory regions EMPTY_MR to be mapped to the target namespace TGT_NS.

In another example, when the first empty table entry EMPTY_TBL_ENT1 does not exist among the empty table entries EMPTY_TBL_ENT and a second empty table entry EMPTY_TBL_ENT2, in which the total sum of the sizes of corresponding empty memory regions EMPTY_MR is larger than the target size TGT_SIZE, exists among the empty table entries EMPTY_TBL_ENT, the step S1420 may determine that some of the empty memory regions EMPTY_MR corresponding to the second empty table entry EMPTY_TBL_ENT2 as empty memory regions EMPTY_MR to be mapped to the target namespace TGT_NS.

In a further example, when the first empty table entry EMPTY_TBL_ENT1 and the second empty table entry EMPTY_TBL_ENT2 do not exist among the empty table entries EMPTY_TBL_ENT, the step S1420 may determine one or more non-sequential empty memory regions EMPTY_MR, among the empty memory regions EMPTY_MR recorded in the empty table EMPTY_TBL, as empty memory regions EMPTY_MR to be mapped to the target namespace TGT_NS.

The method for operating the storage device 100 may include mapping the empty memory regions EMPTY_MR searched at the step S1420 to the target namespace TGT_NS (S1430).

The method for operating the storage device 100 may further include setting, according to whether the empty memory regions EMPTY_MR mapped to the target namespace TGT_NS are sequential or non-sequential, a flag FLG corresponding to the target namespace TGT_NS as a first flag FLG_1 or a second flag FLG_2, and determining a physical address PBA mapped to a logical address LBA corresponding to the target namespace TGT_NS according to the flag FLG corresponding to the target namespace TGT_NS.

For example, the step of determining the physical address PBA mapped to the logical address LBA corresponding to the target namespace TGT_NS may determine, when the flag FLG corresponding to the target namespace TGT_NS is the first flag FLG_1, the physical address PBA mapped to the logical address LBA corresponding to the target namespace TGT_NS on the basis of an offset OFFSET of the logical address LBA in the target namespace TGT_NS.

In another example, the step of determining the physical address PBA mapped to the logical address LBA corresponding to the target namespace TGT_NS may determine, when the flag FLG corresponding to the target namespace TGT_NS is the second flag FLG_2, the physical address PBA mapped to the logical address LBA corresponding to the target namespace TGT_NS on the basis of an address mapper ADDR_MAPPER indicating the mapping information between the logical address LBA and the physical address PBA.

Although various embodiments of the disclosed technology have been described with particular specifics and varying details for illustrative purposes, those skilled in the art will appreciate that various modifications, additions and substitutions may be made based on what is disclosed or illustrated in the present disclosure without departing from the spirit and scope of the invention as defined in the following claims.

What is claimed is:
1. A storage device comprising:
a memory including a plurality of memory regions; and
a controller configured to generate mapping information between the plurality of memory regions and one or more namespaces, to record information on empty memory regions, among the plurality of memory regions, that are not mapped to any namespace, in a table including the information on empty memory regions, and to determine, when a target namespace, which is a logical partition mapped to at least one of the plurality of memory regions, having a target size is created, empty memory regions to be mapped to the target namespace from among the empty memory regions recorded in the table including the information on empty memory regions, wherein the controller sets a flag corresponding to the target namespace as a first flag when empty memory regions mapped to the target namespace are sequential, sets a flag corresponding to the target namespace as a second flag when empty memory regions corresponding to the target namespace are non-sequential, and translates a physical address mapped to a logical address corresponding to the target namespace according to a flag corresponding to the target namespace, wherein, when the empty memory regions are sequential, a physical address range of the empty memory regions mapped to the target namespace is one consecutive physical address range, and wherein, when the empty memory regions are non-sequential, the physical address range of the empty memory regions mapped to the target namespace are two or more physical address ranges non-consecutive to each other.

2. The storage device according to claim 1, wherein the table including the information on empty memory regions includes one or more table entries, and each of the table entries corresponds to one or more sequential empty memory regions.

3. The storage device according to claim 2, wherein, when a first table entry, in which a total sum of sizes of corresponding empty memory regions matches the target size, exists among the table entries in the table including the information on empty memory regions, the controller maps the empty memory regions corresponding to the first table entry to the target namespace.

4. The storage device according to claim 3, wherein, when the first table entry does not exist among the table entries and a second table entry, in which a total sum of sizes of corresponding empty memory regions is larger than the target size, exists among the table entries in the table including the information on empty memory regions, the controller maps some of the empty memory regions corresponding to the second table entry to the target namespace.

5. The storage device according to claim 4, wherein, when the first table entry and the second table entry do not exist among the table entries, the controller maps one or more non-sequential empty memory regions, among the empty memory regions recorded in the table, to the target namespace.

6. The storage device according to claim 1, wherein, when a flag corresponding to the target namespace is the first flag, the controller determines the physical address mapped to the logical address corresponding to the target namespace on the basis of an offset of the logical address.

7. The storage device according to claim 1, wherein, when a flag corresponding to the target namespace is the second flag, the controller determines the physical address mapped to the logical address corresponding to the target namespace on the basis of an address mapper indicating mapping information between the logical address and the physical address.

8. A method for operating a storage device, comprising:
receiving, from an external device, a command indicating that a target namespace, which is a logical partition mapped to at least one of a plurality of memory regions, having a target size has been created;
searching for empty memory regions to be mapped to the target namespace, in a table including information on empty memory regions, in which the information on empty memory regions not mapped to any namespace among the plurality of memory regions is recorded;
mapping the searched empty memory regions to the target namespace;
setting, according to whether the empty memory regions mapped to the target namespace are sequential or non-sequential, a flag corresponding to the target namespace as a first flag or a second flag; and
determining a physical address mapped to a logical address corresponding to the target namespace according to a flag corresponding to the target namespace,
wherein, when the empty memory regions mapped to the target namespace are sequential, a physical address range of the empty memory regions is one consecutive physical address range, and
wherein, when the empty memory regions mapped to the target namespace are non-sequential, the physical address range of the empty memory regions are two or more physical address ranges non-consecutive to each other.

9. The method according to claim 8, wherein
the table includes one or more table entries, and
each of the table entries corresponds to one or more sequential empty memory regions.

10. The method according to claim 9, wherein the searching for empty memory regions to be mapped to the target namespace determines, when a first table entry in which a total sum of sizes of corresponding empty memory regions matches the target size exists among the table entries, the empty memory regions corresponding to the first table entry as empty memory regions to be mapped to the target namespace.

11. The method according to claim 10, wherein the searching for empty memory regions to be mapped to the target namespace determines, when the first table entry does not exist among the table entries and a second table entry, in which a total sum of sizes of corresponding empty memory regions is larger than the target size, exists among the table entries, some of the empty memory regions corresponding to the second table entry as empty memory regions to be mapped to the target namespace.

12. The method according to claim 11, wherein the searching for of empty memory regions to be mapped to the target namespace determines, when the first table entry and the second table entry do not exist among the table entries, one or more non-sequential empty memory regions among the empty memory regions recorded in the table as empty memory regions to be mapped to the target namespace.

13. The method according to claim 8, wherein the determining of a physical address mapped to a logical address corresponding to the target namespace determines, when a flag corresponding to the target namespace is the first flag, a physical address mapped to a logical address corresponding to the target namespace on the basis of an offset of the logical address in the target namespace.

14. The method according to claim 8, wherein the determining of a physical address mapped to a logical address corresponding to the target namespace determines, when a flag corresponding to the target namespace is the second flag, a physical address mapped to a logical address corresponding to the target namespace using an address mapper indicating mapping information between the logical address and the physical address.

15. A controller comprising:
a memory interface capable of communicating with a memory including a plurality of memory regions; and
a control circuit configured to determine, on the basis of information on empty memory regions not mapped to any namespace among the plurality of memory regions, empty memory regions to be mapped to a target namespace, which is a logical partition mapped to at least one of the plurality of memory regions, having a target size among the empty memory regions,
wherein the controller sets a flag corresponding to the target namespace as a first flag when empty memory regions mapped to the target namespace are sequential, sets a flag corresponding to the target namespace as a second flag when empty memory regions corresponding to the target namespace are non-sequential, and translates a physical address mapped to a logical address corresponding to the target namespace according to a flag corresponding to the target namespace,
wherein, when the empty memory regions are sequential, a physical address range of the empty memory regions mapped to the target namespace is one consecutive physical address range, and
wherein, when the empty memory regions are non-sequential, the physical address range of the empty memory regions mapped to the target namespace are two or more physical address ranges non-consecutive to each other.

* * * * *